United States Patent [19]

Howeth

[11] 3,847,021

[45] Nov. 12, 1974

[54] RECORDER SLIDING BASE ASSEMBLY

[76] Inventor: Calvin R. Howeth, P.O. Box 94262, Oklahoma City, Okla. 73109

[22] Filed: July 27, 1973

[21] Appl. No.: 383,423

[52] U.S. Cl. .............................. 73/418, 346/139 C
[51] Int. Cl. ............................................. G01l 7/04
[58] Field of Search ...................... 73/418, 411–417, 73/368.6; 346/139 C, 145

[56] References Cited
UNITED STATES PATENTS 2,392,057  1/1946  Newmark............................ 73/418
3,377,600  4/1968  Nolte ............................. 346/139 C Primary Examiner—Donald O. Woodiel
Attorney, Agent, or Firm—Robert K. Rhea

[57] ABSTRACT

A substantially planar base is secured to a mechanical recorder housing. The base slidably supports a panel for to and fro movement with respect to the base. A Bourdon tube, including a scriber arm movable over a driven chart contained by the housing, is mounted on the panel for movement therewith as a unit to selectively position the scriber with respect to a predetermined zero position.

4 Claims, 3 Drawing Figures

PATENTED NOV 12 1974　　　　　　　　　　　3,847,021

RECORDER SLIDING BASE ASSEMBLY

BACKGROUND OF THE INVENTION

1. Field of the Invention

The present invention relates to mechanical pen recorders and more particularly to a Bourdon tube support base.

Mechanical recording apparatus presently in use generally includes a chart which moves with respect to a pen wherein the pen forms indicia on the chart thus recording the magnitude of a selected measurable variable. One type of such recorder employs a Bourdon tube wherein the pressure connected end of the Bourdon tube is anchored and the movable end of the tube is adjustably connected for calibration with a pen supporting scriber arm. The position of the pen is calibrated for a zero start position at the time of assembly of the recording apparatus. This calibration of the zero start positon of the pen must be done by trained technicians. Frequently the pen position must be recalibrated or adjusted to the start position, as for example, when starting a new series of pressure tests in the field which ordinarily requires that the entire apparatus be returned to a service center for such calibration resulting in the necessity of obtaining another recording apparatus or downtime lost while waiting on the return of the recording apparatus. It is, therefore, desirable that some means be provided whereby field personnel may reposition the pen to a zero position on the chart without moving or adjusting the movable end mounting means of the Bourdon tube.

2. Description of the Prior Art

The prior art generally relates to adjustable calibrating or supporting means for the movable end of a Bourdon tube, or the like, such as is disclosed by U.S. Pat. No. 2,406,098. U.S. Pat. No. 3,521,292 features a Bourdon tube recorder having a cyclicly actuated clutch means intermittently engaging the scriber pen for recording data and reducing the quantity of chart normally moved past the position of the pen.

When the scriber pen fails to return to a zero or start position, while the Bourdon tube is not actuated by pressure in either of the above patents, the calibrating means supporting the movable end of the tube must be readjusted by technicians thus resulting in the loss of use of the recorder while awaiting recalibration.

This invention is distinctive over these patents and other recorders presently in use by providing a base assembly for supporting the Bourdon tube and its mounting means as a unit wherein the Bourdon tube and its mounting means may be moved as a unit with a portion of the base to dispose the recording pen in position with respect to a predetermined index or start position and which may be accomplished by persons not having specialized training in calibrating a Bourdon tube and without the necessity of special tools or equipment.

SUMMARY OF THE INVENTION

A generally planar stationary base is secured within the casing or housing of a recording apparatus containing a chart and means for moving the chart with respect to a recording pen. A slider panel is slidably supported by the stationary base for to and fro movement. The anchorage member, connected with the pressure connected end of a Bourdon tube, is secured to the slider panel. One end of an arm or lever is connected to the slider panel with the other end of the lever supporting a scriber or pen in contactable relation with respect to the chart. The tube calibrating mounting means, connected with the movable end of the Bourdon tube, is in turn connected with the lever adjacent its pivotal connection with the slider panel. The calibrating means is adjusted at the time of assembly of the components in accordance with predetermined parameters and the position of the slider panel with respect to the base is maintained by a block secured to one end portion of the slider panel and threadedly engaging a threaded bolt or shaft, supported by the housing against axial movement but rotatable about its longitudinal axis, thus permitting the sliding base and the Bourdon tube to be moved as a unit by rotation of the threaded shaft for disposing the pen at a start or zero position on the chart at any time its position is not returned to the zero start position after release of pressure applied to the Bourdon tube.

The principle object of this invention is to provide a Bourdon tube assembly mounting apparatus permitting selectively disposing a recording pen movably supported by a Bourdon tube with respect to a predetermined position which may be accomplished in the field by untrained personnel without the use of special tools or equipment.

DESCRIPTION OF THE PREFERRED EMBODIMENT

Figure 1:
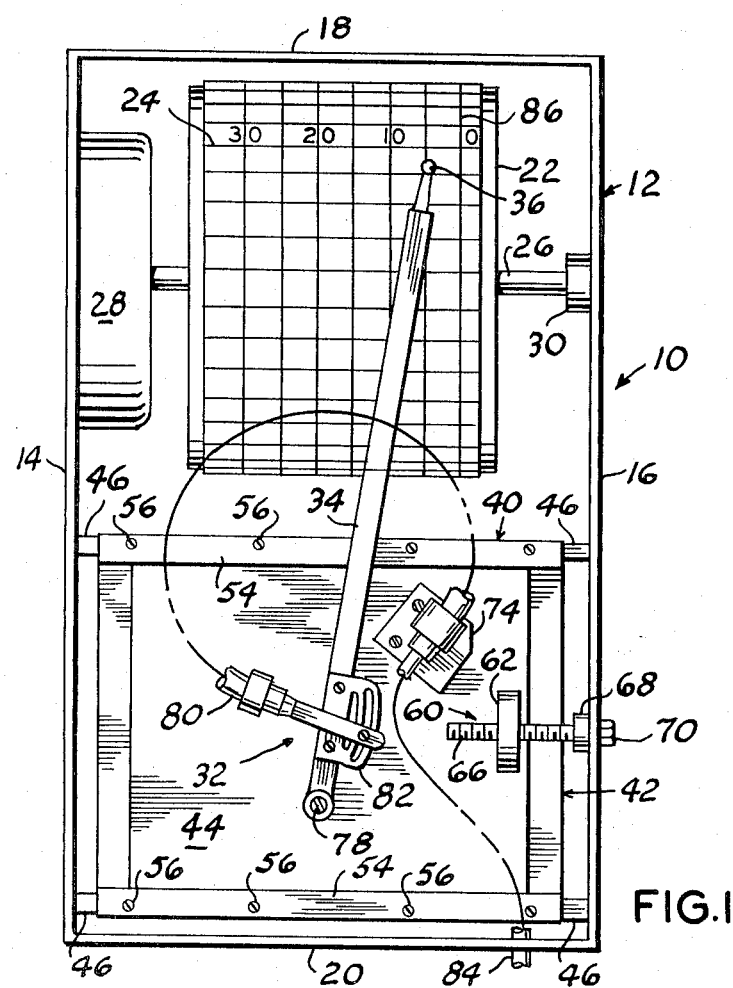
FIG. 1 is a top view of a recording apparatus having the case cover removed and illustrating the relative position of the Bourdon tube base mounting assembly with respect to the other components.
Figure 2:
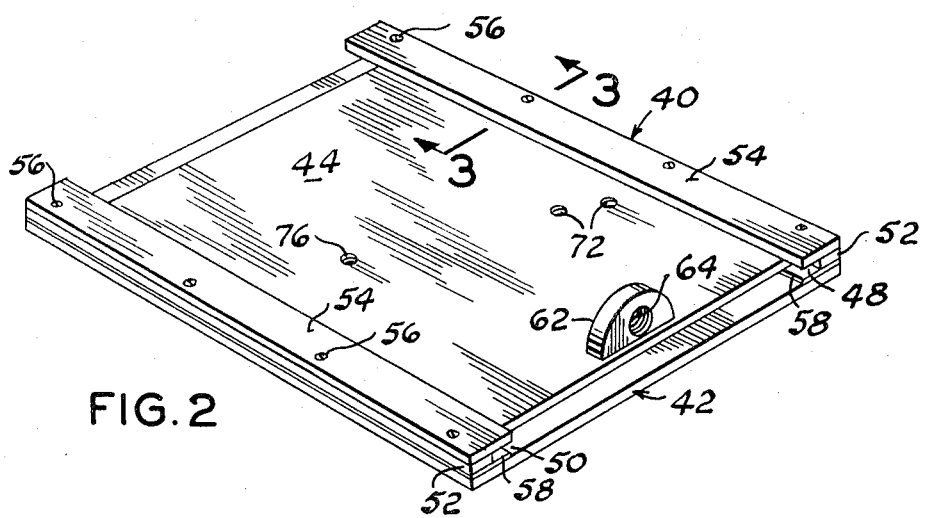
FIG. 2 is a perspective view of the sliding base Bourdon tube mounting assembly, per se; and, FIG. 3 is a fragmentary vertical cross-sectional view, to a further enlarged scale, taken substantially along the line 3—3 of FIG. 2.
Figure 3:
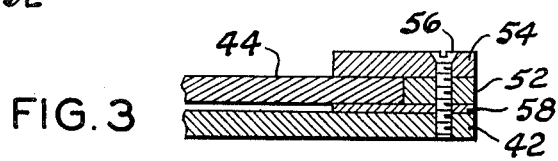

Like characters of reference designate like parts in those figures of the drawings in which they occur.

In the drawings:

The reference numeral 10 indicates a recording apparatus, as a whole, including a generally rectangular case or housing 12 having side walls 14 and 16 joined with end walls 18 and 20. The apparatus 10 further includes a drum 22 having a data receiving chart 24 supported by the periphery of the drum. The drum 22 is mounted on an axle 26 driven by a clock 28, or the like, secured to the housing 14 with the other end of the axle 26 journalled by a bearing 30 secured to the housing wall 16.

A Bourdon tube assembly, indicated at 32, is normally mounted within the housing 12 and operatively connected with an arm or lever 34 supporting a scriber or pen 36 which forms indicia on the chart 24.

The above described components are conventional in a Bourdon tube recording apparatus and are set forth to illustrate their relationship with the invention.

The sliding base assembly, indicated generally at 40, comprises a stationary generally planar base 42 and a slider panel 44. The base 42 is disposed within the housing 12 and secured to supports 46 connected with or extending between the housing side walls 14 and 16.

The stationary base 42 is generally rectangular and a pair of U-shaped grooves or sockets 48 and 50 are formed in or provided at opposing marginal edge portions of the base. In the example shown, the sockets 48 and 50 are formed by superposed strips or strap metal members 52 and 54 overlying and secured to the base by a plurality of pins or screws 56 so that the sockets 48 and 50 are coextensive with longitudinal sides of the base and aligned in cooperative confronting relation.

The sliding panel 44 is rectangular planar having respective marginal sides slidably disposed within the sockets 48 and 50 and longitudinally slidably therein. The length of the sliding panel 44 is preferably less than the overall length of the base 42 for the purposes readily apparent. Thus, as shown in the drawing, the sliding panel 44 overlies the upper surface of the base 42 and to reduce the coefficient of sliding friction, a relatively thin spacer 58, having a length equal to the length of the base 42 and a transverse width equal to the width of the strip member 54, is interposed between the base 42 and intermediate strip member 52 thus supporting the slider panel 44 in close spaced relation with respect to the adjacent surface of the base 42.

Slider panel moving means 60, comprising a block 62 having a threaded aperture 64, is secured to one end portion of the slider panel adjacent one of its ends. A threaded bolt or shaft 66 is threadedly received at one end portion by the threaded aperture 64. The other end portion of the shaft 66 extends through the housing side wall 16 and is held in place against axial movement by a collar 68. Rotation of the shaft 66 about its longitudinal axis, as by a wrench, or the like, not shown, engaging the shaft head 70 moves the slider panel 44 relative to the base 42 in a direction according to the direction of rotation of the shaft 66 for the purposes presently explained.

The slider panel 44 is provided with a pair of threaded bores 72 for attaching the Bourdon tube anchorage member 74 thereto. The sliding panel 74 is also provided with a third threaded bore 76 for receiving a screw 78 pivotally connecting one end portion of the lever 34 thereto. The movable end of the Bourdon tube 80 is connected with Bourdon tube calibrating means 82 which is in turn secured to the lever 34 adjacent its connection with the sliding panel. A flexible tube 84, connected with a source of pressure, not shown, extends through the housing end wall 20 and is connected with the tube anchorage member 74 in a conventional manner.

OPERATION

In operation the recording apparatus normally functions in a conventional manner wherein the pen 36 forms indicia, not shown, on the chart 24 in accordance with pressure or its absence as applied to the Bourdon tube. In the event no pressure is being applied to the Bourdon tube and the scriber pen is not positioned at the index or zero line 86 of the chart, as illustrated in FIG. 1, the threaded shaft 66 is rotated about its longitudinal axis in turn moving the slider panel 44 and Bourdon tube assembly 32, including the slider panel 44, toward the right, as viewed in the drawings, thus moving the pen 36 to register with the position of the index or zero line 86. Thus, it may be seen that the Bourdon tube assembly, particularly its calibrating means 82, is not changed during such movement of the slider panel 44 but simply registers the pen 36 with a zero or start position so that the recording apparatus then functions in a normal manner to form indicia on the chart.

Obviously the invention is susceptible to changes or alterations without defeating its practicability, therefore, I do not wish to be confined to the preferred embodiment shown in the drawings and described herein.

I claim:

1. A Bourdon tube mounting apparatus, comprising:

a stationary base,
said base having a coextensive socket formed in opposing marginal edge portions in aligned cooperative confronting relation;
a slider panel overlying said base and having opposing marginal edge portions nested by the base sockets for sliding movement of said slider panel relative to said base,
said slider panel having a plurality of spaced-apart bores for connection with and supporting a Bourdon tube; and,
slider panel moving means including a block, having a threaded aperture, secured to a marginal edge portion of said slider panel for receiving one end portion of an axially stationary revoluble shaft.

2. The apparatus according to claim 1 in which said base is characterized by a planar surface disposed in parallel underlying spaced relation with respect to the adjacent surface of said slider panel.

3. The apparatus according to claim 1 and further including:
friction reducing spacers interposed between said base and said slider panel.

4. In a mounting apparatus for a Bourdon tube having an anchorage member secured to the stationary end of the tube and having an indicator lever adjustably connected, intermediate its ends, with the movable end of the tube, the improvement comprising:
a housing;
a base within said housing and being secured thereto, said base having a coextensive socket formed in opposing marginal edge portions in aligned cooperative confronting relation;
a slider panel overlying said base and having opposing marginal edge portions nested by the base sockets for sliding movement of said slider panel relative to said base,
said slider panel having a plurality of spaced-apart bores for respectively connecting said Bourdon tube anchorage member and one end of said lever thereto;
a block having a threaded aperture secured to said slider panel intermediate its nested opposing marginal edge portions; and,
a revoluble shaft supported by said housing and having an end portion threadedly engaged with said block for moving said slider panel, whereby the other end of said lever may be selectively disposed with respect to a predetermined position.

* * * * *